United States Patent
Patronas et al.

(10) Patent No.: US 12,483,480 B2
(45) Date of Patent: Nov. 25, 2025

(54) SYSTEMS AND METHODS FOR DYNAMIC RECONFIGURATION OF NETWORK COMMUNICATIONS

(71) Applicant: Mellanox Technologies, Ltd., Yokneam (IL)

(72) Inventors: Ioannis (Giannis) Patronas, Athens (GR); Paraskevas Bakopoulos, Ilion (GR); Dimitrios Syrivelis, Volos (GR); Elad Mentovich, Tel Aviv (IL); Eitan Zahavi, Zichron Yaakov (IL); Louis Bennie Capps, Jr., Georgetown, TX (US); Prethvi Ramesh Kashinkunti, Chicago, IL (US); Julie Irene Marcelle Bernauer, Palo Alto, CA (US); Nikolaos Terzenidis, Kilkis (GR)

(73) Assignee: Mellanox Technologies, Ltd., Yokneam (IL)

( * ) Notice: Subject to any disclaimer, the term of this patent is extended or adjusted under 35 U.S.C. 154(b) by 372 days.

(21) Appl. No.: 17/964,367

(22) Filed: Oct. 12, 2022

(65) Prior Publication Data
US 2024/0113943 A1     Apr. 4, 2024

(30) Foreign Application Priority Data
Oct. 3, 2022     (GR) .......................... GR20220100813

(51) Int. Cl.
*H04L 41/12*     (2022.01)
*H04L 49/253*    (2022.01)

(52) U.S. Cl.
CPC ............ *H04L 41/12* (2013.01); *H04L 49/253* (2013.01)

(58) Field of Classification Search
CPC ... H04L 41/12; H04L 49/253; H04L 41/0897; H04L 41/40; H04L 41/0816
See application file for complete search history.

(56) References Cited

U.S. PATENT DOCUMENTS 6,981,174 B1     12/2005  Hanning
9,544,185 B1 *    1/2017  Yadav ................. H04L 41/0659
(Continued)

FOREIGN PATENT DOCUMENTS

EP     1009192 A2     6/2000

OTHER PUBLICATIONS

"Credo Announces HiWire SWITCH AEC-Enabling Simpler Faster and More Reliable Dual TOR Connectivity", [online] Jul. 15, 2021. Retrieved from the internet https://financialpost.com/pmn/press-releases-pmn/business-wire-news-releases-pmn/credo-announces-hiwire-switch-aec-enabling-simpler-faster-and-more-reliable-dual-tor-connectivity.

Mellette, W. et al., "P-FatTree: A Multi-channel Datacenter Network Topology", [online] HotNets 16: Proceedings of the 15th ACM Workshop on Hot Topics in Networks, Nov. 2016, pp. 78-84. Retrieved from the internet https://doi.org/10.1145/3005745.3005746.

(Continued)

*Primary Examiner* — Nicholas R Taylor
*Assistant Examiner* — Angela Widhalm De Rodriguez
(74) *Attorney, Agent, or Firm* — Anup Iyer; Moore & Van Allen PLLC

(57) ABSTRACT

Systems, computer program products, and methods are described herein for dynamic reconfiguration of network communications. An example system includes a first network pod including a first set of network ports, a second network pod including a second set of network ports, a set of network cores, and a first intermediate network switch. The first intermediate switch operatively couples the first network pod, the second network pod, and the set of network cores. The first intermediate network switch is configured to selectively establish full bisectional bandwidth data communication between a subset of the set of network cores, a subset of the first set of network ports, and a subset of the second set of network ports.

16 Claims, 10 Drawing Sheets

(56) References Cited

U.S. PATENT DOCUMENTS

| | | |
|---|---|---|
| 10,996,401 B2 | 5/2021 | Mentovich et al. |
| 11,303,379 B1 | 4/2022 | Becker et al. |
| 11,350,189 B2 | 5/2022 | Bakopoulos et al. |
| 11,368,768 B2 | 6/2022 | Bakopoulos et al. |
| 11,456,805 B2 | 9/2022 | Becker et al. |
| 11,561,352 B2 | 1/2023 | Kalavrouziotis et al. |
| 11,570,125 B2 | 1/2023 | Bakopoulos et al. |
| 11,630,266 B2 | 4/2023 | Aharon et al. |
| 11,630,274 B2 | 4/2023 | Kalavrouziotis et al. |
| 11,630,369 B2 | 4/2023 | Bakopoulos et al. |
| 11,664,983 B2 | 5/2023 | Mentovich et al. |
| 11,711,147 B2 | 7/2023 | Argyris et al. |
| 11,711,318 B1 | 7/2023 | Patronas et al. |
| 11,765,188 B2 | 9/2023 | Syrivelis et al. |
| 2012/0008945 A1* | 1/2012 | Singla .................. H04J 14/0267 398/45 |
| 2014/0270762 A1* | 9/2014 | Li ........................... H04L 49/45 398/45 |
| 2015/0304238 A1 | 10/2015 | Brown |
| 2017/0054524 A1* | 2/2017 | Gumaste .............. H04B 10/032 |
| 2019/0114877 A1 | 4/2019 | Hohman |
| 2020/0304406 A1* | 9/2020 | Thubert ................. H04L 45/64 |
| 2021/0288921 A1* | 9/2021 | Levy .................. H04L 49/1515 |
| 2022/0173980 A1 | 6/2022 | Yoon |

OTHER PUBLICATIONS

Michelogiannakis, G. et al., "Bandwidth Steering in HPC Using Silicon Nanophotonics", [online] In Proceedings of the International Conference for High Performance Computing, Networking, Storage and Analysis, Nov. 17-22, 2019, Denver, CO., pp. 1-25. Retrieved from the internet https://doi.org/10.1145/3295500.3356145.

Minkenberg, C et al., "Large-Scale System Partitioning using OCS," [online] 2015 International Conference on Photonics in Switching (PS), Florence, Italy, 2015, pp. 235-237. Retrieved from the internet doi: 10.1109/PS.2015.7329011.

Patronas, et al., pending U.S. Appl. No. 17/956,035, filed Sep. 29, 2022.

Patronas, et al., pending U.S. Appl. No. 17/956,208, filed Sep. 29, 2022.

Patronas, et al., pending U.S. Appl. No. 17/982,827, filed Nov. 8, 2022.

Patronas, et al., pending U.S. Appl. No. 17/982,895, filed Nov. 8, 2022.

Patronas, et al., pending U.S. Appl. No. 18/083,981, filed Dec. 19, 2022.

\* cited by examiner

SYSTEMS AND METHODS FOR DYNAMIC RECONFIGURATION OF NETWORK COMMUNICATIONS

CROSS-REFERENCE TO RELATED APPLICATIONS

This application claims priority to Greek Patent Application No. 20220100813, filed Oct. 3, 2022, the entire contents of which application are hereby incorporated herein by reference.

TECHNOLOGICAL FIELD

Example embodiments of the present disclosure relate generally to network communications and, more particularly, to the dynamic reconfiguration of network communications.

BACKGROUND

Modern networks often include a large number of interconnected network ports (e.g., electrical switches, host terminals, and/or the like). With a significant increase in data traffic across networks, achieving full bisectional bandwidth comes with significant cost, complexity, and power consumption. Applicant has identified a number of deficiencies and problems associated with network systems and associated communications. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for dynamic reconfiguration of network communications. In one aspect, a system for dynamic reconfiguration of network communications is provided. The system may include a first network pod including a first set of network ports, a second network pod including a second set of network ports, a set of network cores, and a first intermediate network switch configured to operatively couple the first network pod, the second network pod, and the set of network cores. The first intermediate network switch may be configured to selectively establish full bisectional bandwidth data communication between a subset of the set of network cores, a subset of the first set of network ports, and a subset of the second set of network ports.

In some embodiments, in selectively establishing full bisectional bandwidth data communication between a subset of the set of network cores, the subset of the first set of network ports, and the subset of the second set of network ports, the first intermediate network switch may be further configured to receive a first stimulus to establish data communication between a first network port associated with the first network pod and a second network port associated with the second network pod using the subset of the network cores. Responsive to the first stimulus, the first intermediate network switch may operatively couple the first network port and the second network port using the first network pod, the second network pod, and the subset of the network cores.

In some embodiments, the first intermediate network switch may be further configured to, in response to receiving the first stimulus, disable a remaining subset of the network cores.

In some embodiments, the first intermediate network switch may be further configured to receive a second stimulus to establish data communication between the first network pod and the second network pod. Responsive to the second stimulus, the first intermediate network switch may operatively couple the first set of network ports and the second set of network ports.

In some embodiments, the first intermediate network switch may be further configured to, responsive to the second stimulus, terminate a communication link between the first network pod, the second network pod, and the set of network cores and operatively couple the first set of network ports and the second set of network ports.

In some embodiments, a second intermediate network switch operatively coupled to the first set of network ports is provided. In such an embodiment, the first set of network ports may include a first set of input network ports and a first set of output network ports operatively coupled in a first network configuration. The second intermediate network switch may be configured to receive a third stimulus to reconfigure the first network pod from the first network configuration to a second network configuration and, responsive to the third stimulus, operatively couple a subset of the first set of input network ports and a subset of the first set of output network ports in the second network configuration selectively to establish full bisectional bandwidth data communication.

In some further embodiments, the first set of input network ports may be spine switches, and the first set of output network ports may be leaf switches.

In some further embodiments, the first set of input network ports may be leaf switches, and the first set of output network ports may be host terminals.

In some further embodiments, the second network configuration may be a mesh network configuration or a torus interconnect network configuration.

In some further embodiments, the second intermediate network switch may be further configured to physically isolate at least a portion the first set of network ports.

In another aspect, an apparatus for allocating bandwidth for network communications is provided. The apparatus may operatively couple a first network pod, a second network pod, and a set of network cores. The apparatus may be configured to receive a first stimulus to establish data communication between a first network port associated with the first network pod and a second network port associated with the second network pod using a subset of the network cores. Responsive to the first stimulus, the apparatus may operatively couple the first network port and the second network port using the first network pod, the second network pod, and the subset of the network cores.

In yet another aspect, a method for allocating bandwidth for network communications is presented. The method may include receiving a first stimulus to establish data communication between a first network port associated with a first network pod and a second network port associated with a second network pod using a subset of network cores. Responsive to the first stimulus, the method may include operatively coupling the first network port and the second network port using the first network pod, the second network pod, and the subset of the network cores.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
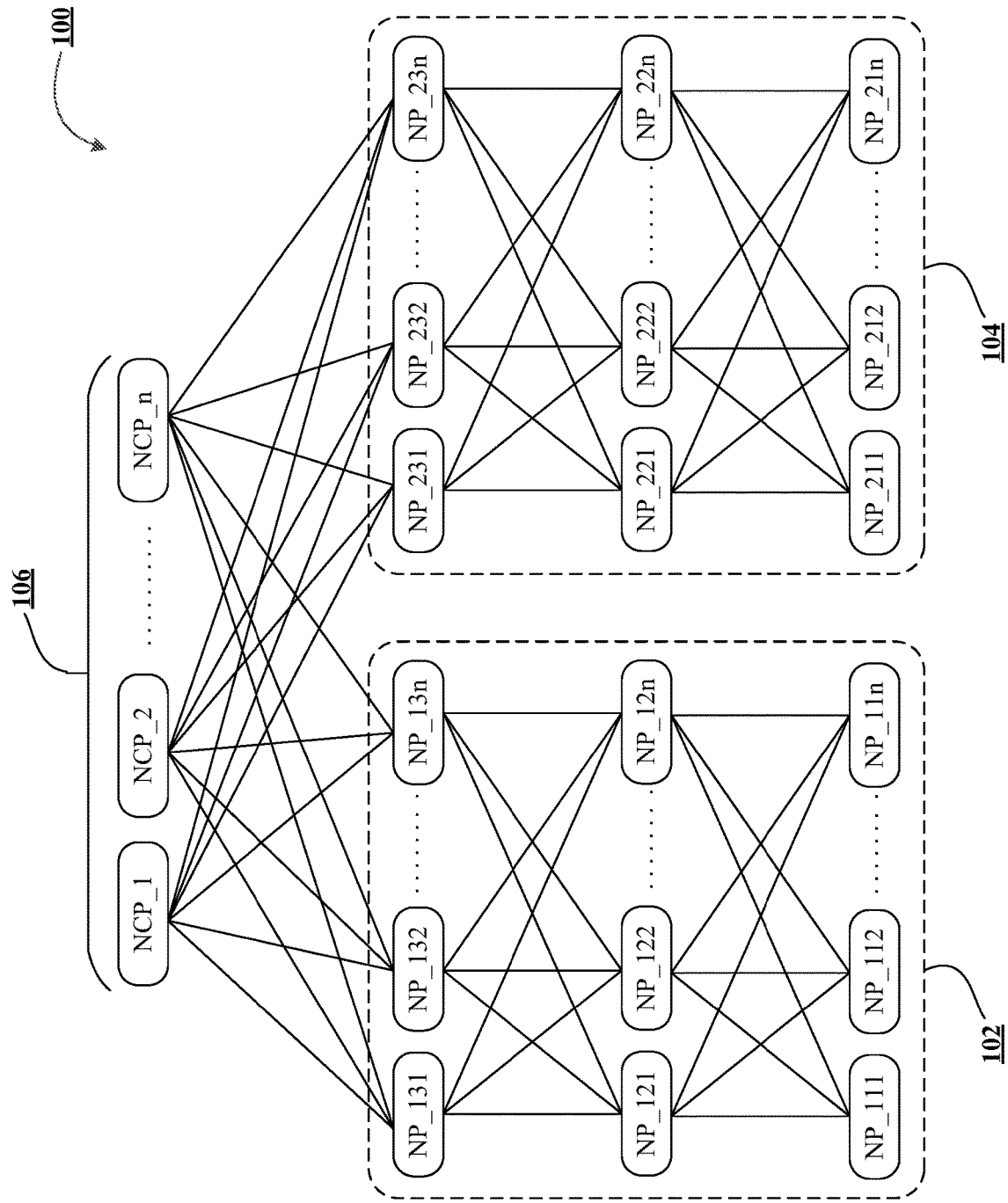
FIG. 1 illustrates an example network environment, in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a determined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

As described herein, network ports forming a network port pair may be referred to with reference to "input" and "output" network ports such that each network port pair includes a respective input network port and output network port. As such, the terms "input" and "output" are used merely for illustrative purposes in that the data, signals, information, and/or the like, that is transmitted by the network port pair may travel in either direction. In other words, an example input network port may operate as an output network port, and an example output network port may operate as an input network port. The present disclosure, therefore, contemplates that the network ports described herein may operate to transmit data, signals, and information to and receive data, signals, and information from any device communicably coupled thereto regardless of reference to input or output.

Furthermore, as would be evident to one of ordinary skill in the art in light of the present disclosure, the terms "substantially" and "approximately" indicate that the referenced element or associated description is accurate to within applicable engineering tolerances.

FIG. 1 illustrates an example network environment 100, in accordance with an embodiment of the present disclosure. As shown in FIG. 1, the network environment 100 may include a first network pod 102, a second network pod 104, and a set of network cores NCP_1, NCP_2 . . . NCP_n 106. In some embodiments, each network pod (e.g., the first network pod 102 and the second network pod 104) may be structured to have a multi-layer network architecture. Such a multi-layered architecture may be formed such that each layer includes a plurality of network ports by, with, and/or through which data, signals, information, and/or the like may be communicated. As such, the plurality of network ports may include any networking component or device, such as a switch, a server, a network interface controller (NIC), a networking card, a host terminal, and/or the like. Furthermore, the network pods (e.g., first network pod 102 and/or second network pod 104) may refer to any collection, portion, segment, etc. of network ports, cores, switches, etc. at the same or any combination of different network levels based upon the intended application of the network environment 100.

As shown in FIG. 1, a first layer of the first network pod 102 may include network ports NP_111, NP_112 . . . NP_11n, a second layer of the first network pod 102 may include network ports NP_121, NP_122 . . . NP_12n, and a third layer of the first network pod 102 may include network ports NP_131, NP_132 . . . NP_13n. Similarly, a first layer of the second network pod 104 may include network ports NP_211, NP_212 . . . NP_21n, a second layer of the second network pod 104 may include network ports NP_221, NP_222 . . . NP_22n, and a third layer of the second network pod 104 may include network ports NP_231, NP_232 . . . NP_23n. As described hereinafter, the particular network ports within the first network pod 102 and the second network pod 104 may vary in connection, network configuration, etc., and these connections may, in some embodiments, be dynamically modified during operation.

In some embodiments, the multi-layer network architecture may include a leaf-spine architecture or topology. A leaf-spine architecture is a data center network topology that may include two switching layers—a leaf layer (e.g., second layer), and a spine layer (e.g., third layer). The leaf layer may include leaf switches that aggregate traffic from host terminals and connect directly to the spine switches. Spine switches may interconnect leaf switches in a full or partial mesh topology, forming an access layer that delivers network connection points for the host terminals. As such, in some embodiments, the network ports NP_111, NP_112 . . . NP_11n in the first layer of the first network pod 102 may be host terminals, the network ports NP_121, NP_122 . . . NP_12n in the second layer of the first network pod 102 may be leaf switches, and the network ports NP_131, NP_132 . . . NP_13n in the third layer of the first network pod 102 may be spine switches. Similarly, the network ports NP_211, NP_212 . . . NP_21n in the first layer of the second network pod 104 may be host terminals, the network ports NP_221, NP_222 . . . NP_22n in the second layer of the second network pod 104 may be leaf switches, and the network ports NP_231, NP_232 . . . NP_23n in the third layer of the second network pod 104 may be spine switches.

With continued reference to FIG. 1, the network environment 100 may further include a set of network cores NCP_1, NCP_2 . . . NCP_n 106. In some embodiments, the set of network cores NCP_1, NCP_2 . . . NCP_n 106 may be high-capacity network ports that are positioned within the backbone or physical core of the network. The network cores NCP_1, NCP_2 . . . NCP_n 106 may serve as the gateway to a wide area network (WAN) or the Internet, in that, they provide the final aggregation point for the network and allow multiple aggregation modules to work together.

It is to be understood that the structure of the network environment 100 and its components, connections, relationships, and their functions, are meant to be exemplary only, and are not meant to limit implementations of the embodiments described and/or claimed in this document. In one example, while the individual devices, such as network ports and network cores are defined to have specific functionality, it is to be understood that their functionalities and terminology used to describe them may be flexible and interchangeable. In another example, the network environment 100 may include more, fewer, or different devices and/or components. In yet another example, some or all of the portions of the network environment 100 may be combined into a single portion or all of the portions of the network environment 100 may be separated into two or more distinct portions.

Figure 3:
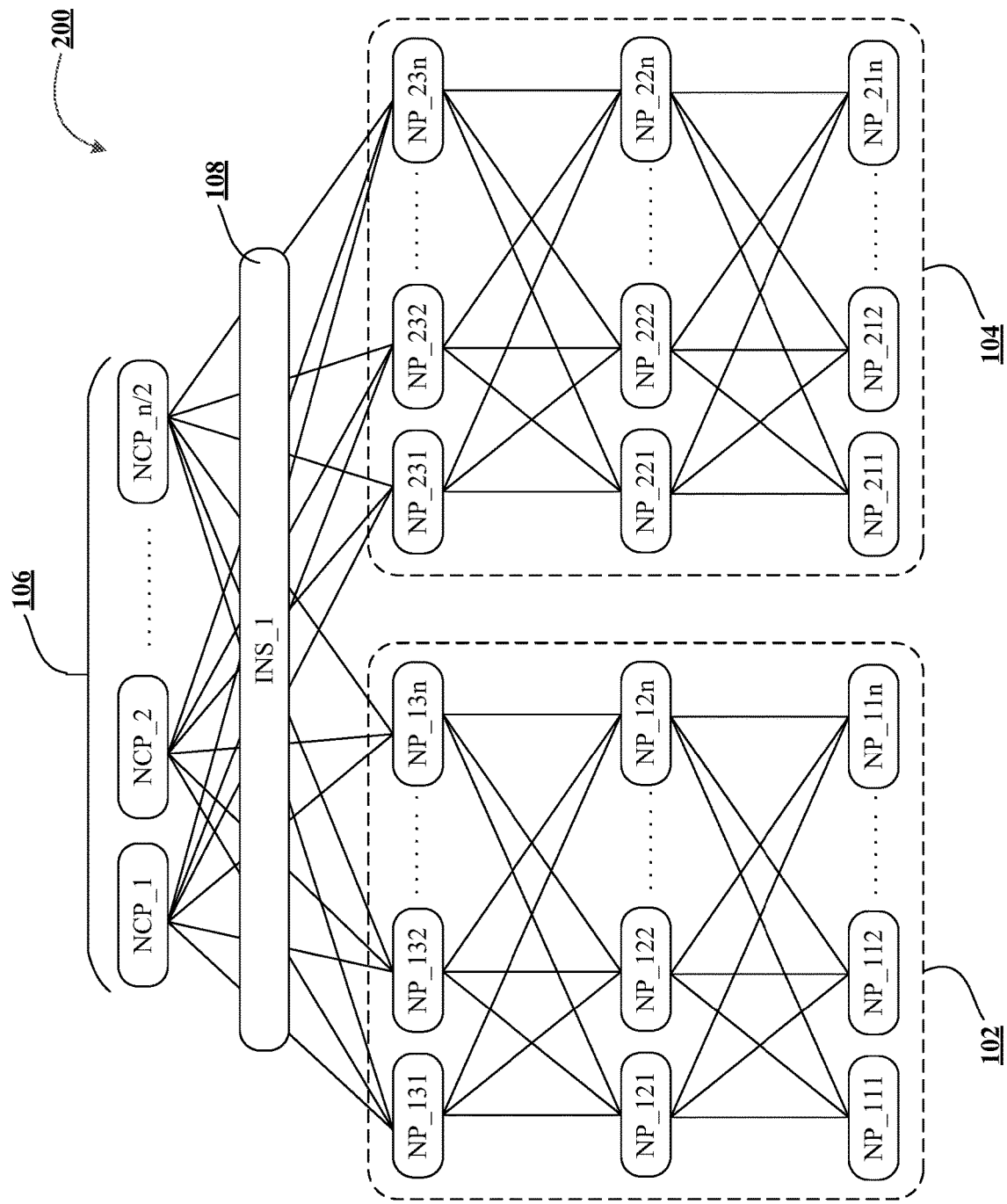
FIG. 3 illustrates an example network environment for achieving full bisectional bandwidth using an intermediate network switch, in accordance with one or more embodiments of the present disclosure.

In the network environment as shown in FIG. 1, delivering on-demand bandwidth for data communications requires achieving full bisectional bandwidth. As described above with regard to conventional systems, achieving full bisectional bandwidth poses significant challenges, including cost, complexity, and scalability. For example, a network pod with 32 network ports in the third layer (e.g., spine switches) and 32 network ports in the second layer (e.g., leaf switches), with each network port in the third layer (spine switches) having 32 uplink connections, requires a total of 1024 network cores to 1:1 provide full bisectional bandwidth. By introducing an intermediate network switch (e.g., an optical switch) as illustrated in FIG. 3 and described hereafter to facilitate and route communication between the network ports, the embodiments of the present disclosure provide for a network environment with fewer network cores, with the option to selectively connect additional network pods on demand, and dynamically allocate of bandwidth to particular network port clusters to achieve full bisectional bandwidth.

Figure 2:
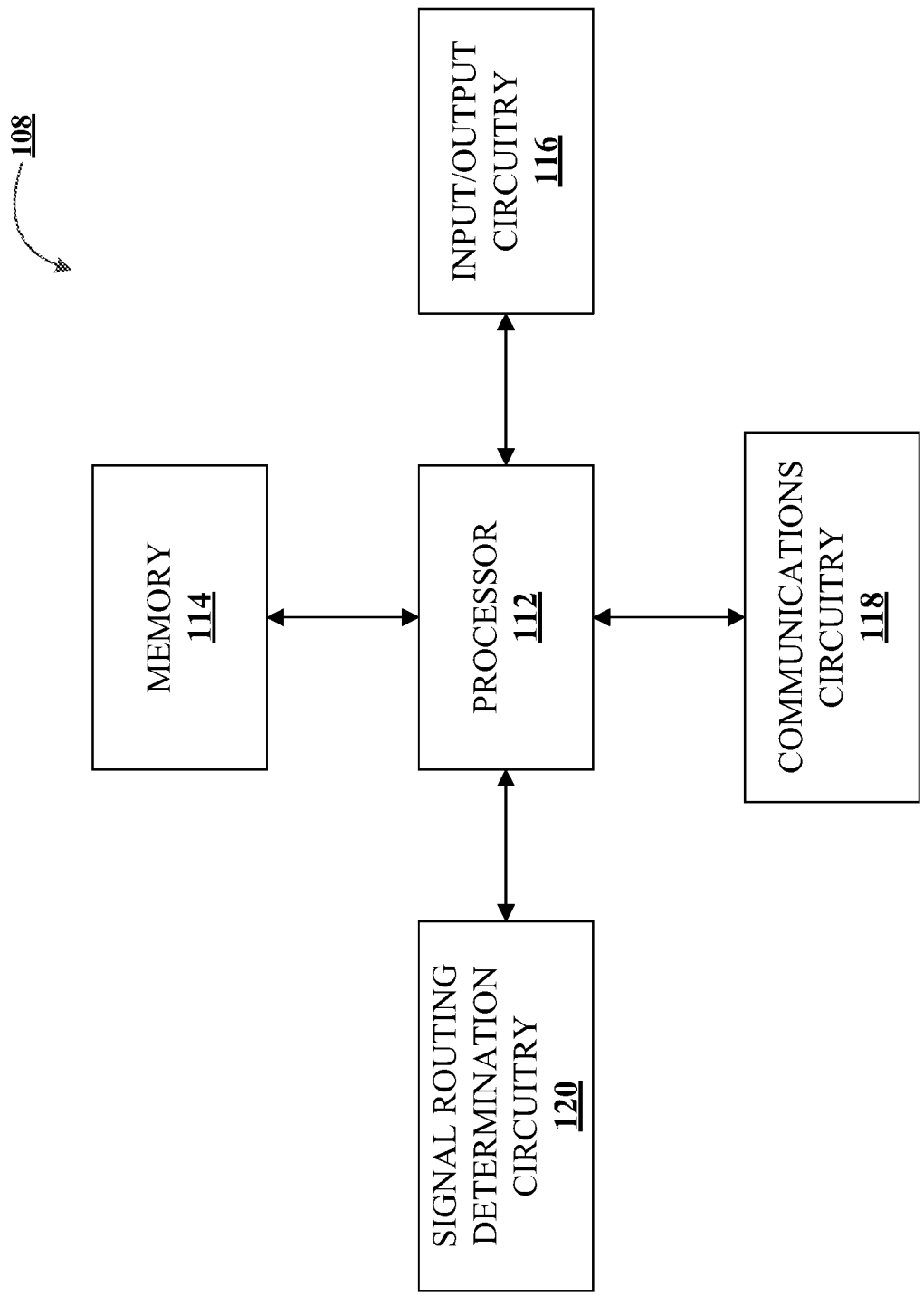
FIG. 2 illustrates an example block diagram of an intermediate network switch, in accordance with one or more embodiments of the present disclosure.

FIG. 2 illustrates an example block diagram of an intermediate network switch 108, in accordance with an embodiment of the present disclosure. The components discussed in FIG. 2 may be a part of the intermediate network switch 108 or a controller, networking card, computing device, and/or the like that is associated with the intermediate network switch 108. In some embodiments, the intermediate network switch 108 may include a memory 114, processor 112, input/output circuitry 116, communications circuitry 118, and/or signal routing determination circuitry 120. For example, where signal routing determination circuitry 120 is included in the intermediate network switch 108, the signal routing determination circuitry 120 may be configured to facilitate the functionality discussed herein regarding reconfiguring network communication between various network ports. An apparatus, such as the intermediate network switch 108, may be configured, using one or more of circuitry 114-120, to execute the operations described herein.

Although the term "circuitry" as used herein with respect to components 114-120 is described in some cases using functional language, it should be understood that the particular implementations necessarily include the use of particular hardware configured to perform the functions associated with the respective circuitry as described herein. It should also be understood that certain of these components 114-120 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the intermediate network switch 108 may be housed within this device, while other components are housed within other devices (e.g., a controller in communication with the intermediate network switch 108).

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the intermediate network switch 108 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, intermediate network switch 108. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the intermediate network switch 108, to carry out various functions in accordance with example embodiments of the present disclosure.

Although illustrated in FIG. 2 as a single memory, the memory 114 may comprise a plurality of memory components. The plurality of memory components may be embodied on a single computing device or distributed across a plurality of computing devices. In various embodiments, the memory 114 may include, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 114 may be configured to store information, data, applications, instructions, or the like for enabling the intermediate network switch 108 to carry out various functions in accordance with example embodiments discussed herein. For example, in at least some embodiments, the memory 114 is configured to buffer data for processing by the processor 112. Additionally or alternatively, in at least some embodiments, the memory 114 is configured to store program instructions for execution by the processor 112. The memory 114 may store information in the form of static and/or dynamic information. This stored information may be stored and/or used by the intermediate network switch 108 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, the processor 112 comprises a plurality of processors. The plurality of processors may be embodied on a single computing device or may be distributed across a plurality of such devices collectively configured to function as the intermediate network switch 108. The plurality of processors may be in operative communication with each other and may be collectively configured to perform one or more functionalities of the intermediate network switch 108 as described herein.

In an example embodiment, the processor 112 may be configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure processor 112 to perform one or more algorithms and/or operations described herein when the instructions are executed. For example, these instructions, when executed by processor 112, may cause the intermediate network switch 108 to perform one or more of the functionalities of intermediate network switch 108 as described herein.

In some embodiments, the intermediate network switch 108 further includes input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. Input/output circuitry 116 may include a user interface and may include a web user interface, a mobile application, a kiosk, or the like. The input/output device may be used by a user to view and/or adjust malfunction indications (e.g., a user may indicate whether a malfunction has been resolved).

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the intermediate network switch 108 may be implemented as an end-user machine or other type of device designed for complex user interactions. In some embodiments (like other components discussed herein), the input/output circuitry 116 may be eliminated from intermediate network switch 108. The input/output circuitry 116 may be in communication with memory 114, communications circuitry 118, and/or any other component(s), such as via a bus. Although more than one input/output circuitry and/or other component can be included in the intermediate network switch 108, only one is shown in FIG. 2 to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the intermediate network switch 108. In this regard, the communications circuitry 118 may include, for example, a network interface for enabling communications with a wired or wireless communication network. For example, in some embodiments, communications circuitry 118 is configured to receive and/or transmit any data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, the communications circuitry 118 may include circuitry for interacting with the antenna(s) to cause transmission of signals via the antenna(e) or to handle receipt of signals received via the antenna(e). These signals may be transmitted by the intermediate network switch 108 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of intermediate network switch 108, such as via a bus. The communication circuitry 118 of the intermediate network switch 108 may also be configured to receive and transmit information with the various network ports discussed herein.

In some embodiments, the intermediate network switch 108 may include hardware, software, firmware, and/or a combination of such components, configured to support various aspects of signal routing in network ports as described herein. It should be appreciated that in some embodiments, the signal routing determination circuitry 120 performs one or more of such example actions in combination with another set of circuitry of the intermediate network switch 108, such as one or more of the memory 114, processor 112, input/output circuitry 116, and communications circuitry 118. For example, in some embodiments, the signal routing determination circuitry 120 may utilize processing circuitry, such as the processor 112 and/or the like, to perform one or more of its corresponding operations. In a further example, and in some embodiments, some or all of the functionality of the signal routing determination circuitry 120 may be performed by processor 112. In this regard, some or all of the example processes and algorithms discussed herein can be performed by at least one processor 112 and/or signal routing determination circuitry 120. It should also be appreciated that, in some embodiments, signal routing determination circuitry 120 may include a separate processor, specially configured field programmable gate array (FPGA), or application specific interface circuit (ASIC) to perform its corresponding functions. Additionally or alternatively, in some embodiments, the signal routing determination circuitry 120 may use the memory 114 to store collected information. For example, in some implementations, the signal routing determination circuitry 120 includes hardware, software, firmware, and/or a combination thereof, that interacts with the memory 114 to send, retrieve, update, and/or store data.

Accordingly, non-transitory computer readable storage media can be configured to store firmware, one or more application programs, and/or other software, which include instructions and/or other computer-readable program code portions that can be executed to direct operation of the intermediate network switch 108 to implement various operations, including the examples shown herein. As such, a series of computer-readable program code portions may be embodied in one or more computer-program products and can be used, with a device, intermediate network switch 108, database, and/or other programmable apparatus, to produce the machine-implemented processes discussed herein. It is also noted that all or some of the information discussed herein can be based on data that is received, generated and/or maintained by one or more components of the intermediate network switch 108. In some embodiments, one or more external systems (such as a remote cloud computing and/or data storage system) may also be leveraged to provide at least some of the functionality discussed herein.

FIG. 3 illustrates an example network environment that achieves full bisectional bandwidth using an intermediate network switch 108, in accordance with an embodiment of the present disclosure. As shown in FIG. 3, the network environment 200 may include a first network pod 102, a second network pod 104, and a subset of network cores NCP_1, NCP_2 . . . NCP_n/2 106. It is to be understood that the use of the subset of network cores NCP_1, NCP_2 . . . NCP_n/2 is exemplary and any fraction of the number of network cores, such as NCP_1, NCP_2 . . . NCP_n/4, NCP_1, NCP_2 . . . NCP_n/6, NCP_1, NCP_2 . . . NCP_n/8 may be used. In addition, as shown in FIG. 3, the network environment 200 may include an intermediate network switch INS_1 108 (e.g., first intermediate network switch) that is configured to operatively couple the first network pod 102, the second network pod 104, and the subset of network cores NCP_1, NCP_2 . . . NCP_n/2 106 to facilitate data communication therebetween. As described herein, by introducing the intermediate network switch INS_1 108, the network environment 200 may be reconfigured into a hybrid electro-optical switching environment which allows for a network environment, such as the network environment 200, to have fewer network cores and full bisectional bandwidth. In such a configuration, the intermediate network switch INS_1 108 may also be configured to disable the remaining subset of the network cores (e.g., NCP_n/2 . . . NCP_n), thus reducing the overall power consumption without compromising bandwidth.

Figure 4:
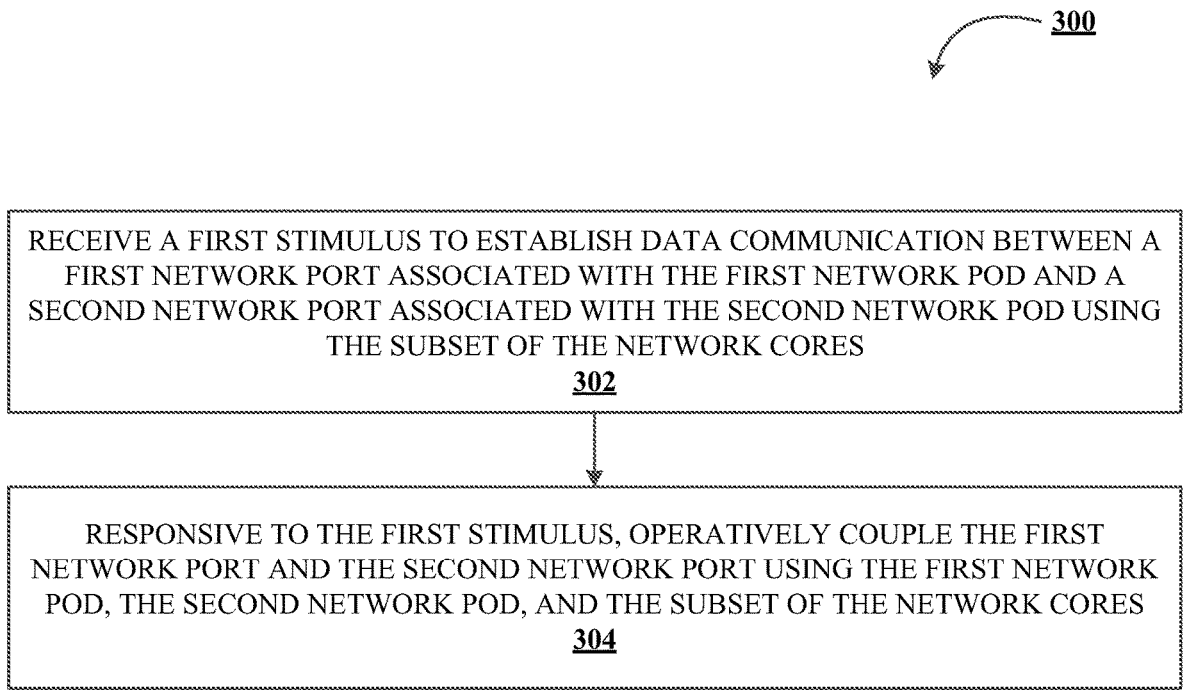
FIG. 4 illustrates an example method for reconfiguring a network environment to achieve full bisectional bandwidth using a first intermediate network switch.

FIG. 4 illustrates a method (e.g., method 300) for reconfiguring a network environment to achieve full bisectional bandwidth using a first intermediate network switch (e.g., intermediate network switch INS_1 108), in accordance with an embodiment of the present disclosure.

As shown in block 302, the method may include receiving a first stimulus to establish data communication between a first network port associated with the first network pod (e.g., first network pod 102) and a second network port associated with the second network pod (e.g., second network pod 104) using only a subset of the network cores (e.g., subset of network cores NCP_1, NCP_2 . . . NCP_n/2 106). In some embodiments, the first network port may be associated with the first set of network ports of the first network pod 102, and the second network port may be associated with the second set of network ports of the second network pods 104.

The first stimulus, in some embodiments, may be received from a computing device (e.g., a user input device) associated with the network environment. In such instances, in one aspect, a user may selectively identify a subset of network cores 106 and trigger an intermediate network switch INS_1 108 to not only operatively couple the subset of the network cores NCP_1, NCP_2 . . . NCP_n/2 106, the first network pod, 102 and the second network pod 104, but also disable the remaining subset of network cores NCP_n/2 . . . NCP_n. In another aspect, the stimulus may be automatically generated by the computing device (e.g., user input device) and transmitted to the intermediate network switch INS_1 108 to initiate a set of defined functions, such as reconfiguration of the network environment to achieve full bisectional bandwidth. In some other embodiments, the stimulus may be received from a network port (e.g., NP_111) associated with the first network pod 102 or a network port (e.g., NP_211) associated with the second network pod 104.

As shown in block 304, the method may operatively couple the first network port and the second network port using the first network pod 102, the second network pod 104, and the subset of the network cores NCP_1, NCP_2 . . . NCP_n/2 106 in response to receiving the first stimulus. In coupling the first network port and the second network port using the first network pod 102, the second network pod 104, and the subset of the network cores NCP_1, NCP_2 . . . NCP_n/2 106, the intermediate network switch INS_1 108 may be configured to selectively establish full bisectional bandwidth for data communications between a subset of the first set of network ports associated with the first network pod 102, a subset of the second set of network ports associated with the second network pod 104, and the subset of network cores NCP_1, NCP_2 . . . NCP_n/2 106. As described herein, in addition to operatively coupling the first network pod 102, the second network pod 104, and the subset of the network cores NCP_1, NCP_2 . . . NCP_n/2 106, the intermediate network switch INS_1 108 may be configured to disable the remaining subset of the network cores NCP_n/2 . . . NCP_n in response to receiving the stimulus.

Figure 5:
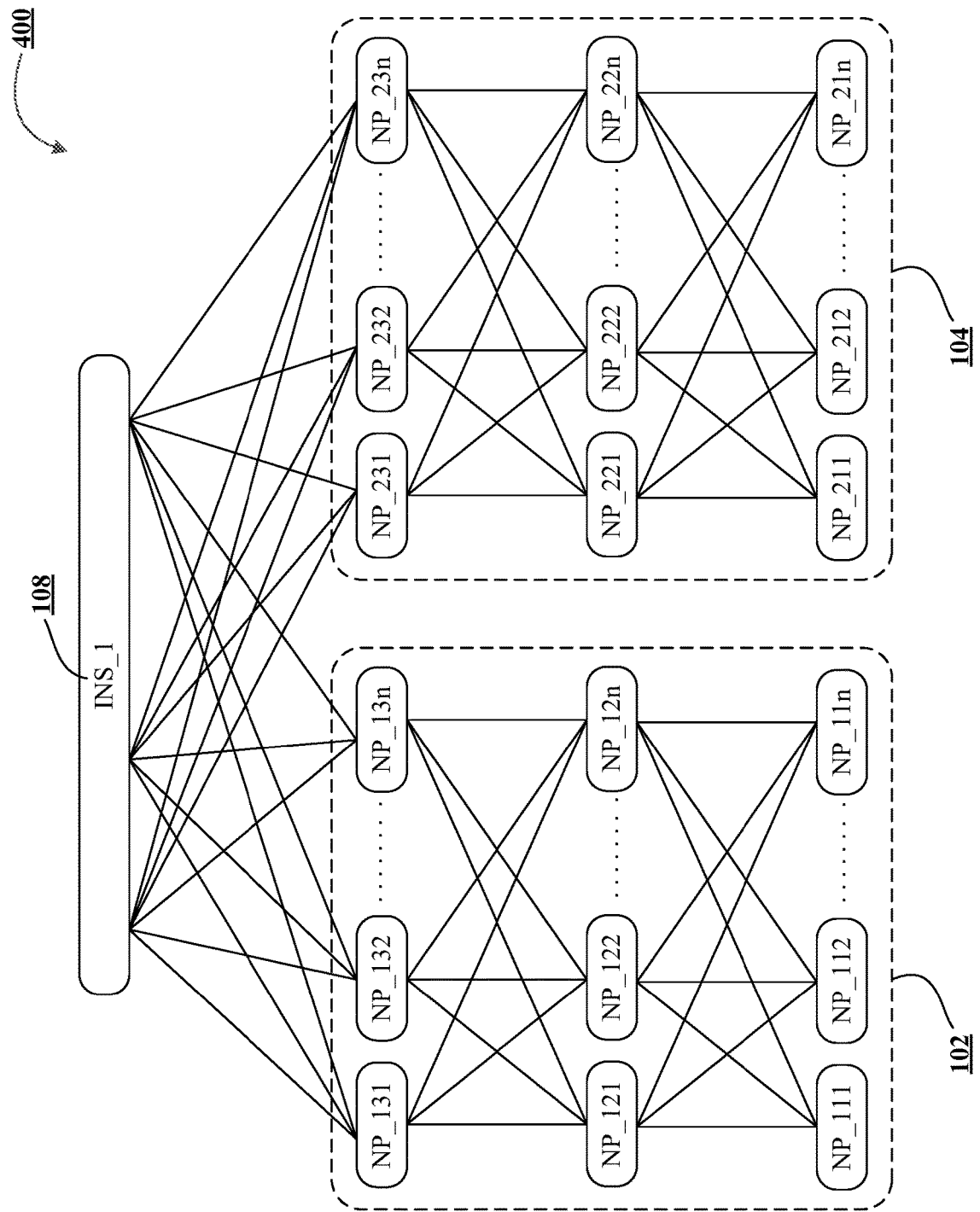
FIG. 5 illustrates an example network environment replacing network cores with intermediate network switches, in accordance with one or more embodiments of the present disclosure.

FIG. 5 illustrates an example network environment 400 replacing network cores with intermediate network switches, in accordance with an embodiment of the present disclosure. As shown in FIG. 5, the network environment 400 may include a first network pod 102, a second network pod 104, and an intermediate network switch INS_1 108 that is configured to replace the set of network cores and their associated functionalities. It is to be understood that the use of a singular intermediate network switch (such as the intermediate network switch INS_1 108) is exemplary, and any number of intermediate network switches may be used as needed to operatively couple the first network 102 and the second network pod 104 to one another and serve as the gateway to a wide area network (WAN) or the Internet. As described herein, by introducing the intermediate network switch INS_1 108, the network environment 400 may be reconfigured into a hybrid electro-optical switching environment where the set of network cores (not shown) is replaced with the intermediate network switch INS_1 108, thereby reducing the overall number of devices (e.g., network cores) required to provide substantially similar performance with full bisectional bandwidth. In such a configuration, the intermediate network switch INS_1 108 may also be configured to disable the set of the network cores.

Figure 6:
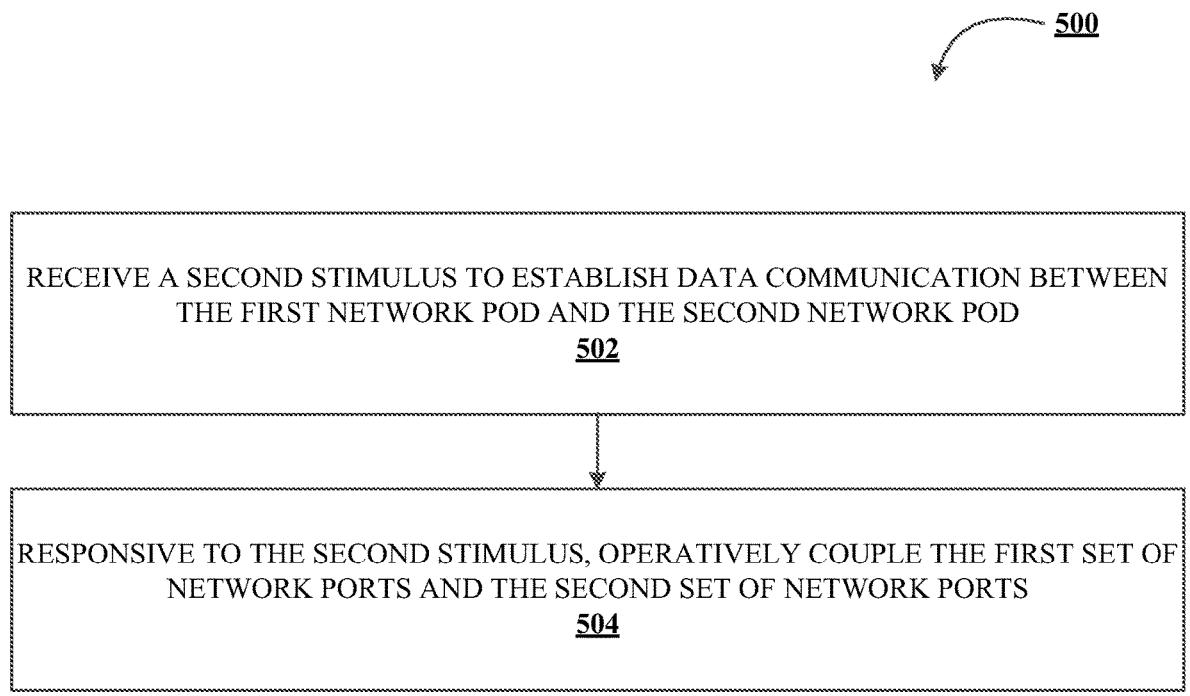
FIG. 6 illustrates an example method for replacing network cores with a first intermediate network switch, in accordance with one or more embodiments of the present disclosure.

FIG. 6 illustrates a method (e.g., method 500) for replacing network cores with a first intermediate network switch (e.g., intermediate network switch 108), in accordance with an embodiment of the present disclosure.

As shown in block 502, the method may include receiving a second stimulus to establish data communication between the first network pod 102 and the second network pod 104 by replacing the set of network cores with the intermediate switch INS_1 108. As described herein, the stimulus (e.g., the second stimulus), in some embodiments, may be received from a computing device (e.g., a user input device) associated with the network environment. In such instances, in one aspect, a user may select a number of intermediate network switches to replace the set of network cores. In another aspect, the stimulus may be automatically generated by the computing device (e.g., user input device) and transmitted to the intermediate network switches to initiate a set of defined functions, such as replacing the set of network cores while still maintaining full bisectional bandwidth. In some other embodiments, the stimulus may be received from a network port (e.g., NP_111) associated with the first network pod 102 or a network port (e.g., NP_211) associated with the second network pod 104.

Similar to the first stimulus, the second stimulus, in some embodiments, may be received from a computing device (e.g., a user input device) associated with the network environment. In such instances, in one aspect, a user may selectively identify one or more intermediate network switches with which to replace the set of network cores. In another aspect, the second stimulus may be automatically generated by the computing device (e.g., user input device) and transmitted to the intermediate network switch INS_1 108 to initiate a set of defined functions, such as serving as the gateway to a wide area network (WAN) or the Internet and providing full bisectional bandwidth for data communication between the first network pod 102 and the second network 104. In some other embodiments, the second stimulus may be received from a network port (e.g., NP_111) associated with the first network pod 102 or a network port (e.g., NP_211) associated with the second network pod 104.

As shown in block 504, the method may include operatively coupling the first set of network ports and the second set of network ports in response to receiving the second stimulus. In coupling the first set of network ports and the second set of network ports, the intermediate network switch INS_1 108 may be configured to replace the functionalities of the network cores (e.g., serve as the gateway to a wide area network (WAN) or the Internet) and provide full bisectional bandwidth for data communication therebetween. In some embodiments, in response to receiving the second stimulus, the intermediate network switch INS_1 108 may be configured to disable the set of network cores, effectively terminating the communication link between the first network pod 102, the second network pod 104, and the set of network cores (not shown).

Figure 7A:
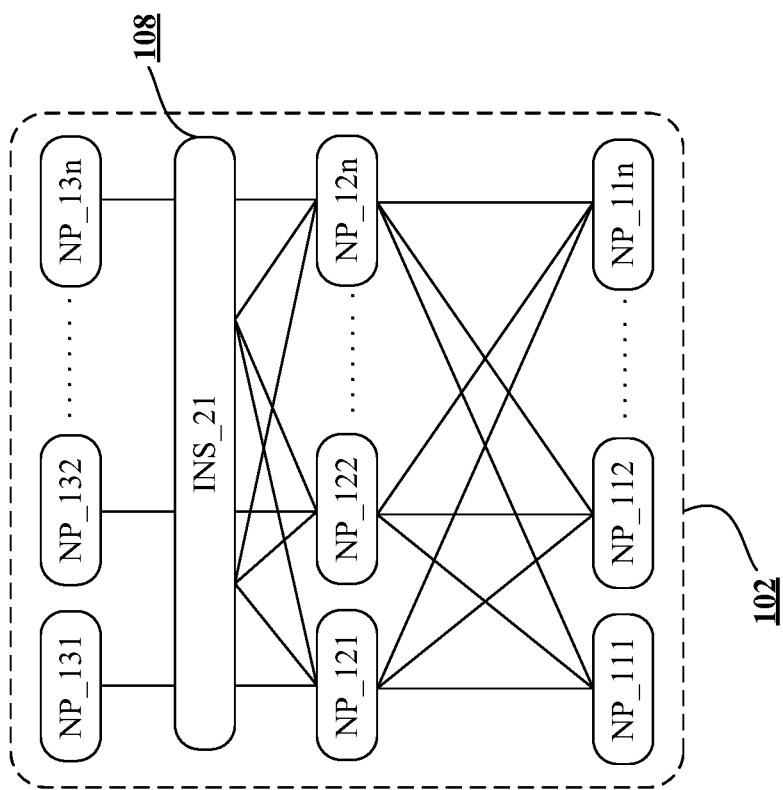
FIGS. 7A-7B illustrate example network pods dynamically reconfigured using an intermediate network switch, in accordance with one or more embodiments of the present disclosure.
Figure 7B:
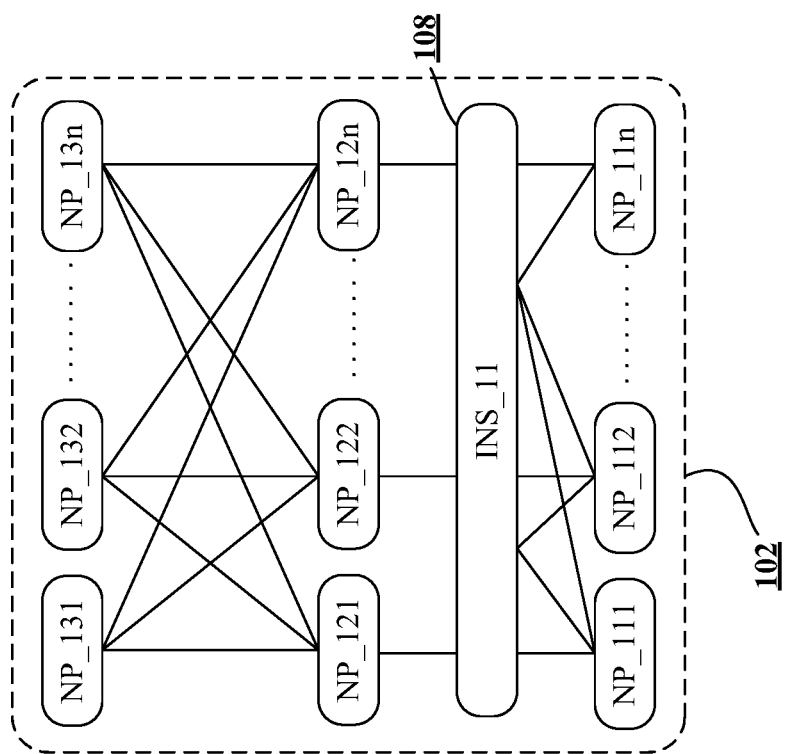

FIGS. 7A-7B illustrate example network pods dynamically reconfigured using an intermediate network switch, in accordance with an embodiment of the present disclosure. As shown in FIGS. 7A-7B, the first network pod 102 may be structured to have a multi-layer network architecture with each layer formed of a plurality of network ports. More particularly, the first layer of the first network pod 102 may include network ports NP_111, NP_112 . . . NP_11n, the second layer of the first network pod 102 may include network ports NP_121, NP_122 . . . NP_12n, and the third layer of the first network pod 102 may include network ports NP_131, NP_132 . . . NP_13n.

In a fully connected network pod with no intermediate network switch, such as the first network pod 102 shown in FIG. 1, any data communication between two network ports in the same layer requires at least one network hop. For example, for data communication between NP_121 and NP_122 in the second layer of the first network pod 102, the data packets are required to traverse across layers, either from NP_121 in the second layer to any of the network ports in the third layer and finally to NP_122, or from NP_121 in the second layer to any of the network ports in the first layer and finally to NP_122 for successful communication. Introducing an intermediate network switch allows for dynamic restructuring of the network configuration to facilitate particular network communications, such as data communication between two network ports in the same layer more efficiently.

Accordingly, as shown in FIG. 7A, the first network pod 102 may include an intermediate network switch INS_21 108 operatively connecting the network ports NP_121, NP_122 . . . NP_12n in the second layer and the network ports NP_131, NP_132 . . . NP_13n in the third layer of the first network pod 102. The intermediate network switch INS_21 108 may be configured to dynamically reconfigure the network configuration (e.g., network topology) between network ports NP_121, NP_122 . . . NP_12n in the second layer and the network ports NP_131, NP_132 . . . NP_13n in the third layer. For example, as shown in FIG. 7A, the intermediate switch INS_21 108 may be configured to selectively establish operative coupling between the network ports NP_121, NP_122 . . . NP_12n in the second layer to form a fully or partially connected mesh network configuration between a selective subset of the network ports in the first network pod 102 (e.g., a fully connected mesh network configuration between the network ports, NP_121, NP_122 . . . NP_12n). In doing so, data communications between NP_121 and NP_122 are facilitated directly by the intermediate switch INS_21 108 and remove the requirement of data packets to hop across layers. The new mesh configuration (fully connected or partially connected), torus interconnect configuration, etc. may also include network ports of the third layer of the network, such as NP_131.

Similarly, data communication between network ports NP_111 and NP_112 in the first layer of the first network pod 102 (e.g., two host terminals), requires at least one hop (e.g., from the NP_111 in the first layer to any of the network ports in the second layer and finally to NP_112 in the first layer). Introducing an intermediate network switch allows for dynamic restructuring of the network configuration to facilitate data communication between two host terminals in the same layer more efficiently. Accordingly, as shown in FIG. 7B, the first network pod 102 may include an intermediate network switch INS_12 108 operatively coupling the network ports NP_111, NP_112 . . . NP_11n in the first layer of the first network pod 102. The intermediate network switch INS_12 108 may be configured to dynamically reconfigure the network configuration (e.g., network topology) between network ports NP_111, NP_112 . . . NP_11n in the first layer. For example, as shown in FIG. 7B, the intermediate switch INS_12 108 may be configured to selectively establish operative coupling between the network ports NP_111, NP_112 . . . NP_11n in the first layer to form a fully or partially connected mesh network configuration between a particular subset of the network ports in first network pod 102 (e.g., a fully connected mesh network configuration between the network ports, NP_111, NP_112 . . . NP_11n). In doing so, data communications between NP_111 and NP_112 are facilitated directly by the intermediate switch INS_12 108 without the requirement that data packets hop across layers. The new mesh configuration (fully connected or partially connected), torus interconnect configuration, etc. may also include network ports of the second layer of the network such as NP_121.

Figure 8:
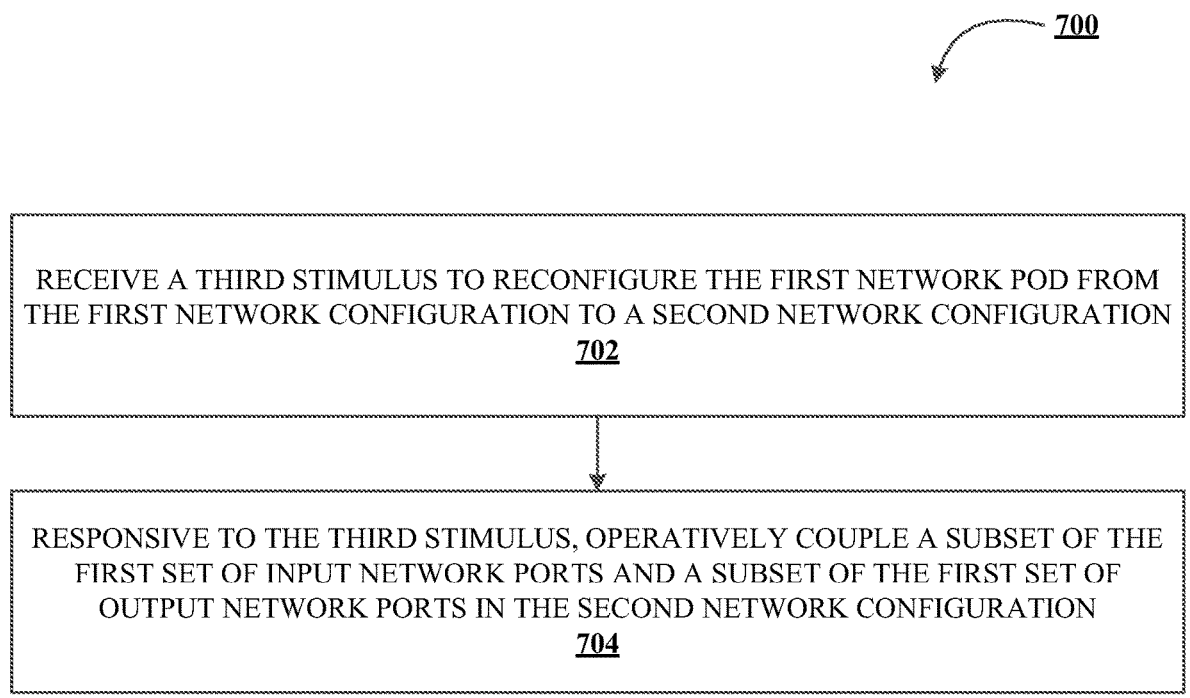
FIG. 8 illustrates a method for dynamic reconfiguration of network communications using an intermediate network switch, in accordance with one or more embodiments of the present disclosure.

FIG. 8 illustrates a method for dynamic reconfiguration of network communications using an intermediate network switch 700, in accordance with an embodiment of the present disclosure.

As shown in block 702, the method may include receiving a third stimulus to reconfigure the first network pod from the first network configuration to a second network configuration. As used herein, "network configuration" may refer to a physical and logical arrangement of network ports within a network. Example network configurations may include a mesh configuration (fully connected or partially connected), torus interconnect configuration, tree configuration, ring configuration, hybrid configuration, N-dimensional torus/mesh configuration, star topology, and/or the like. The present disclosure contemplates that network configuration as used herein may encompass any configuration, arrangement, etc. of networking devices based upon the intended application of the particular network.

In some embodiments, the first network pod, in the first network configuration, may not include an intermediate network switch. In such instances, receiving the third stimulus results in the operative coupling of an intermediate network switch between two layers in the network pod in a particular network configuration. In this regard, in some embodiments, the third stimulus may include information indicating a physical location in the network in which the intermediate network switch is to be coupled. In some other embodiments, the first network pod, in the first network configuration, may already include an intermediate network switch. In such instances, the third stimulus may include an indication of s network configuration change and particular network ports that require operative coupling in that network configuration.

Similar to the first and second stimulus, the third stimulus, in some embodiments, may be received from a computing device (e.g., a user input device) associated with the network environment. In such instances, in one aspect, a user may selectively identify a network configuration, and trigger an appropriate intermediate switch to restructure the network configuration by operatively coupling selective network ports. In another aspect, the second stimulus may be automatically generated by the computing device (e.g., user input device) and transmitted to the intermediate network switch to initiate a set of defined functions, such as restructuring the network configuration from a first network configuration to a second network configuration and continuing to provide full bisectional bandwidth for data communication between the network ports involved. In some other embodiments, the third stimulus may be received from a network port (e.g., NP_111) associated with the first network pod 102 or a network port (e.g., NP_211) associated with the second network pod 104.

As shown in block 704, the method may include operatively coupling a subset of the first set of input network ports and a subset of the first set of output network ports in the second network configuration to establish full bisectional bandwidth data communication in response to receiving the third stimulus. In some embodiments, the input network ports may refer to a set of network ports in a first layer (e.g., host terminals), and output network ports may refer to a set of network ports in a second layer (e.g., leaf switches). In some other embodiments, the input network ports may refer to a set of network ports in the second layer (e.g., leaf switches) and output network ports may refer to a set of network ports in a third layer (e.g., spine switches).

In some embodiments, the intermediate network switch (e.g., first intermediate network switch and/or the second intermediate network switch) may be used to provide a remedial action in case of a perceived or potential security threat. In embodiments where network port(s), network core(s), and/or network pod(s) are either likely to be impacted by a security threat and/or are currently impacted by a security threat, the remedial action may include physically isolating the network port(s), the network core(s), and/or the network pod(s). In doing so, the intermediate network switch may prevent any harmful impact affecting the network port(s), the network core(s), and/or the network pod(s) to propagate through the remainder of the network. In some embodiments, isolating the network port(s), the network core(s), and/or the network pod(s) may include air gapping the network port(s), the network core(s), and/or the network pod(s), whereby all communication links (wired or wireless) to the network port(s), the network core(s), and/or the network pod(s) are terminated. In other words, air gapping the network port(s), the network core(s), and/or the network pod(s) ensures that the network port(s), the network core(s), and/or the network pod(s) are no longer able to communicate with any of the other network ports, cores, or pods in the network environment or any other network environment.

Figure 9:
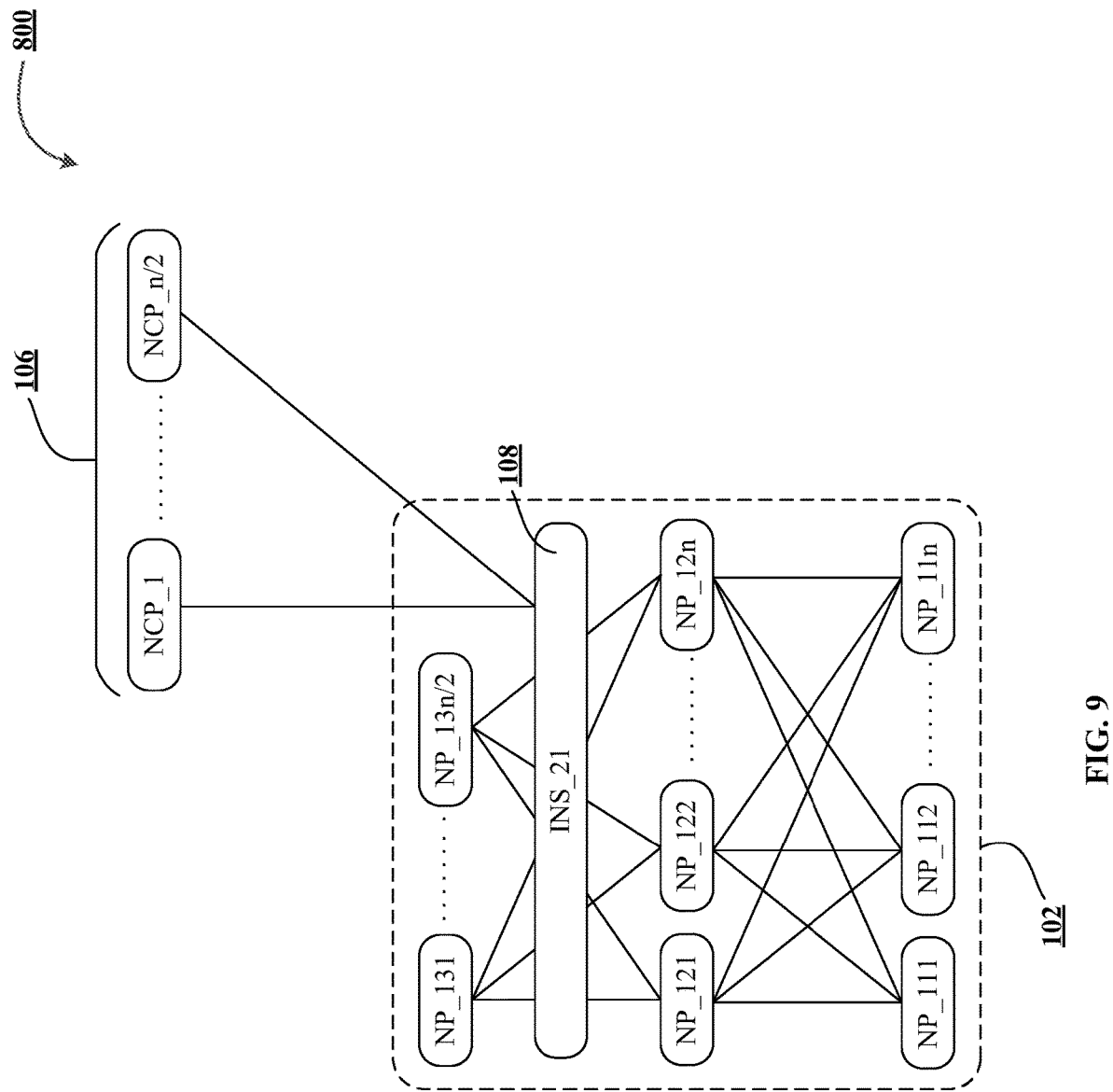
FIG. 9 illustrates an example network port cluster with an intermediate network switch, in accordance with one or more embodiments of the present disclosure.

FIG. 9 illustrates an example network port cluster 800 isolated using an intermediate network switch, in accordance with an embodiment of the present disclosure. As shown in FIG. 9, the network port cluster may include a first network pod 102 and a subset of the network cores NCP_1 . . . NCP_n/2 106. The first network pod 102 may include a set of network ports in the first layer NP_111, NP_112 . . . NP_11n, a set of network ports in the second layer NP_121, NP_122 . . . NP_12n, and a subset of network ports in the third layer NP_131 . . . NP_13n/2. In addition, the first network pod 102 may include an intermediate switch INS_21 108 operatively coupling the set of network ports in the second layer and the subset of network ports in the first layer to facilitate data communication therebetween. Furthermore, the intermediate network switch INS_21 108 may be operatively coupled to the subset of network cores NCP_1 . . . NCP_n/2 106. By operatively coupling the network ports NP_121, NP_122 . . . NP_12n, the subset of network ports in the third layer NP_131 . . . NP_13n/2, and the subset of network cores NCP_1 . . . NCP_n/2, the intermediate network switch INS_21 108 may be configured to physically isolate the network port cluster and provide full bisectional bandwidth for data communications therewithin. While only one isolated network pod configuration is shown in FIG. 9, it is to be understood that the isolated network port cluster may include multiple other network cores, network ports, and network pods.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system for dynamic reconfiguration of network communications, the system comprising:
   a first network pod comprising a first set of network ports;
   a second network pod comprising a second set of network ports;
   a set of network cores; and
   a first intermediate network switch comprising a first optical switch configured to operatively couple the first network pod, the second network pod, and the set of network cores,
   wherein the first intermediate network switch comprising the first optical switch is configured to selectively establish full bisectional bandwidth data communication between a subset of the set of network cores, a subset of the first set of network ports, and a subset of the second set of network ports by:
   receiving a first stimulus to establish data communication between a first network port associated with the first network pod and a second network port associated with the second network pod using a subset of the network cores;
   responsive to the first stimulus, operatively coupling the first network port and the second network port using the first network pod, the second network pod, and the subset of the network cores; and
   disabling a remaining subset of network cores to reduce a power consumption of the system while maintaining full bisectional bandwidth data communication between the first network port and the second network port.

2. The system of claim 1, wherein the first intermediate network switch is further configured to:
   receive a second stimulus to establish data communication between the first network pod and the second network pod; and
   responsive to the second stimulus, operatively couple the first set of network ports and the second set of network ports.

3. The system of claim 2, wherein the first intermediate network switch is further configured to:
   responsive to the second stimulus, terminate a communication link between the first network pod, the second network pod, and the set of network cores; and
   operatively couple the first set of network ports and the second set of network ports.

4. The system of claim 1, further comprising:
   a second intermediate network switch comprising a second optical switch operatively coupled to the first set of network ports, wherein the first set of network ports comprises a first set of input network ports and a first set of output network ports operatively coupled in a first network configuration, wherein the second intermediate network switch comprising the second optical switch is further configured to:
   receive a third stimulus to reconfigure the first network pod from the first network configuration to a second network configuration; and
   responsive to the third stimulus, operatively couple a subset of the first set of input network ports and a subset of the first set of output network ports in the second network configuration to establish full bisectional bandwidth data communication.

5. The system of claim 4, wherein the first set of input network ports are spine switches, and the first set of output network ports are leaf switches.

6. The system of claim 4, wherein the first set of input network ports are leaf switches, and the first set of output network ports are host terminals.

7. The system of claim 4, wherein the second network configuration is a mesh network configuration or a torus interconnect network configuration.

8. The system of claim 4, wherein the second intermediate network switch is further configured to physically isolate at least a portion the first set of network ports.

9. An optical switch for allocating bandwidth for network communications, the optical switch operatively coupling a first network pod, a second network pod, and a set of network cores, wherein the optical switch is configured to:
receive a first stimulus to establish data communication between a first network port associated with the first network pod and a second network port associated with the second network pod using a subset of the network cores;
responsive to the first stimulus, operatively couple the first network port and the second network port using the first network pod, the second network pod, and the subset of the network cores; and
disable a remaining subset of the network cores in response to receiving the first stimulus so as to reduce a power consumption associated with the network communications while maintaining full bisectional bandwidth data communication between the first network port and the second network port.

10. The optical switch of claim 9, further configured to:
receive a second stimulus to establish data communication between the first network pod and the second network pod; and
responsive to the second stimulus, operatively couple the first set of network ports and the second set of network ports.

11. The optical switch of claim 10, further configured to:
responsive to the second stimulus, terminate a communication link between the first network pod, the second network pod, and the set of network cores; and
operatively couple the first set of network ports and the second set of network ports.

12. The optical switch of claim 9, wherein the first network pod comprises a first set of input network ports and a first set of output network ports operatively coupled in a first network configuration, wherein the optical switch is further configured to:
receive a third stimulus to reconfigure the first network pod from the first network configuration to a second network configuration; and
responsive to the third stimulus, operatively couple a subset of the first set of input network ports and a subset of the first set of output network ports in the second network configuration.

13. The optical switch of claim 12, wherein the optical switch is further configured to physically isolate at least a portion the first set of network ports.

14. A method for allocating bandwidth for network communications, the method comprising:
receiving a first stimulus to establish data communication between a first network port associated with a first network pod and a second network port associated with a second network pod using a subset of network cores;
responsive to the first stimulus, operatively coupling, via a first intermediate network switch comprising a first optical switch, the first network port and the second network port using the first network pod, the second network pod, and the subset of the network cores; and
disable a remaining subset of the network cores in response to receiving the first stimulus so as to reduce a power consumption associated with the network communications while maintaining full bisectional bandwidth data communication between the first network port and the second network port.

15. The method of claim 14, wherein the method further comprises:
receiving a second stimulus to establish data communication between the first network pod and the second network pod; and
responsive to the second stimulus, operatively coupling the first set of network ports and the second set of network ports.

16. The method according to claim 14, further comprising:
receiving a third stimulus to reconfigure a first network pod from a first network configuration to a second network configuration; and
responsive to the third stimulus, operatively coupling a subset of a first set of input network ports and a subset of a first set of output network ports in the second network configuration, wherein the first set of input network ports and the first set of output network ports are associated with the first network pod.

* * * * *